United States Patent [19]

Bartos

[11] Patent Number: 4,705,090

[45] Date of Patent: Nov. 10, 1987

[54] APPARATUS FOR CONTROLLING AIR PRESSURE IN VEHICLE TIRES

[75] Inventor: Josef A. Bartos, Diamond Bar, Calif.

[73] Assignee: Tire Inflation Systems Corp., Eastlake, Ohio

[21] Appl. No.: 819,716

[22] Filed: Jan. 17, 1986

[51] Int. Cl.⁴ ...................... B60C 29/00; B60C 23/16
[52] U.S. Cl. ...................................... 152/417; 137/224
[58] Field of Search ............... 152/415, 416, 417, 427; 141/95, 98; 137/224, 510, 859

[56] References Cited

U.S. PATENT DOCUMENTS

| | | | |
|---|---|---|---|
| 1,619,130 | 3/1927 | Jones | 137/510 |
| 2,452,527 | 10/1948 | Peter | 152/417 |
| 2,634,781 | 4/1953 | Turek | 152/417 |
| 2,685,906 | 8/1954 | Williams | 152/417 |
| 2,976,906 | 3/1961 | Kamm et al. | 152/417 |
| 2,989,999 | 6/1961 | Holbrook et al. | 152/416 |
| 3,705,614 | 12/1972 | Juttner et al. | 152/417 |
| 4,418,737 | 12/1983 | Goodell et al. | 152/416 |
| 4,498,515 | 2/1985 | Holtzhauser et al. | 152/427 X |
| 4,498,709 | 2/1985 | Wells et al. | 152/417 X |

Primary Examiner—Donald E. Czaja
Assistant Examiner—Ramon R. Hoch
Attorney, Agent, or Firm—Body, Vickers & Daniels

[57] ABSTRACT

A vehicle wheel assembly carrying a pneumatic tire includes a hub rotatably mounted on a fixed axle component and provided with an internal air flow passageway. One end of the passageway communicates with the interior of the tire through a pneumatically actuated check valve, and the other end of the passageway is adapted to be connected to an air pressure control system carried by the vehicle. The latter connection is through a sealing arrangement between the rotating hub and fixed axle component and which includes a displaceable seal on the fixed axle component normally maintained out of contact with the rotatable hub. The displaceable seal is adapted to be moved into engagement with the hub by air under pressure from the air pressure control system after which the vehicle tire can be inflated, deflated or checked for pressure through the operation of appropriate controls in the air pressure control system.

29 Claims, 4 Drawing Figures

APPARATUS FOR CONTROLLING AIR PRESSURE IN VEHICLE TIRES

BACKGROUND OF THE INVENTION

This invention relates to the art of effecting and controlling the inflation, deflation and gauging of pneumatic tires on a vehicle and, more particularly, to an improved method and apparatus by which such functions are achieved.

It is well known to provide vehicles with onboard systems and apparatus enabling the vehicle operator to inflate, deflate and/or check the pressure of the vehicle tires with the vehicle at rest or in motion. Such systems and apparatus include a source of air under pressure carried on the vehicle, and valving and sealing arrangements for delivering air to the vehicle tires to inflate the latter, for venting air from the tires when it is desired to reduce the pressure therein, and for connecting the system in a closed mode to an appropriate gauge indicating the tire pressure.

Systems and apparatus heretofore provided for achieving the above functions have been structurally complex and thus both more costly and less efficient and dependable in operation than desired and, in some instances, have necessitated mounting of component parts of the apparatus and system in locations on the vehicle in which the parts are undesirably exposed to damage, such as on the outer ends of the wheel hubs. A major disadvantage in the apparatus and systems heretofore provided resides in the fact that sealing components required between fixed and rotating parts of the wheel assembly to facilitate the delivery of air therebetween constantly engage the rotating part and thus are continuously subjected to wear which reduces seal life and increases down time and maintenance costs. Moreover, the seals are sometimes subjected to constant air pressure from the system which further increases seal wear. Moreover, such sealing arrangements trap moisture in areas of the wheel assembly and thus promote corrosion problems in such areas. Other problems result from the provision of air flow passageways through axle components of the vehicle, which passageways either reduce the strength of the axle or requires a larger structure to assure a desired strength.

SUMMARY OF THE INVENTION

In accordance with the present invention, an improved method and apparatus for controlling the air pressure in pneumatic tires of a vehicle provides the foregoing and other disadvantages in systems and apparatus heretofore available to be minimized or overcome. More particularly in this respect, an air pressure control system in accordance with the present invention minimizes seal wear by providing for engagement between fixed and rotating sealing components only during operation of the system and apparatus to inflate, deflate or gauge tire pressure. In addition to minimizing seal wear, a sealing arrangement according to the present invention provides for the sealed area to be open to atmosphere when the system is not in use, thus avoiding the accumulation of moisture in the seal area and the resulting corrosion problems. Moreover, opening of the sealing area to atmosphere following use of the system provides for the expulsion of air under pressure from the sealing area whereby the latter is effectively self-cleaning.

Further advantages are achieved in accordance with a preferred embodiment of the invention by providing for component parts of the apparatus and system associated with the wheel assembly to be structurally interrelated therewith so as to minimize exposure thereof to damage and to optimize structural integrity of the vehicle axle and component parts of the wheel assembly. Further in accordance with a preferred embodiment, a pneumatically actuated check valve is mounted in a hub component of the wheel assembly, and the sealing arrangement includes a pneumatically displaceable seal element, whereby a structurally simple and efficient arrangement is provided for controlling the flow of air to and from a vehicle tire through the use of the onboard pressurized air source and controls.

It is accordingly an outstanding object of the present invention to provide an improved method and apparatus for controlling the air pressure in pneumatic tires of a vehicle.

Another object is the provision of a method and apparatus of the foregoing character in which wear of sealing components engaging between fixed and rotating parts of the vehicle is minimized and the accumulation of moisture and resulting corrosion problems heretofore encountered in sealed areas of the system are avoided.

Still another object is the provision of a method and apparatus of the foregoing character wherein sealing components are relatively displaceable between open and closed relationships to facilitate the inflating, deflating and gauging of tire pressure in the closed mode and to preclude any wearing engagement therebetween in the open mode, thus to promote seal life and to avoid moisture accumulation therebetween.

A further object is the provision of a method and apparatus of the foregoing character wherein a pneumatically actuated check valve is provided in the wheel assembly to control the flow of air to and from the corresponding vehicle tire and wherein the relatively displaceable seal components include a pneumatically displaceable seal member, whereby the tire inflating, deflating and pressure checking functions are simply and efficiently achieved through use of a source of air under pressure carried on the vehicle.

Still a further object is the provision of a method and apparatus of the foregoing character which is structurally simple, economical, and operationally efficient and reliable.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which.

DESCRIPTION OF A PREFERRED EMBODIMENT

Figure 1:
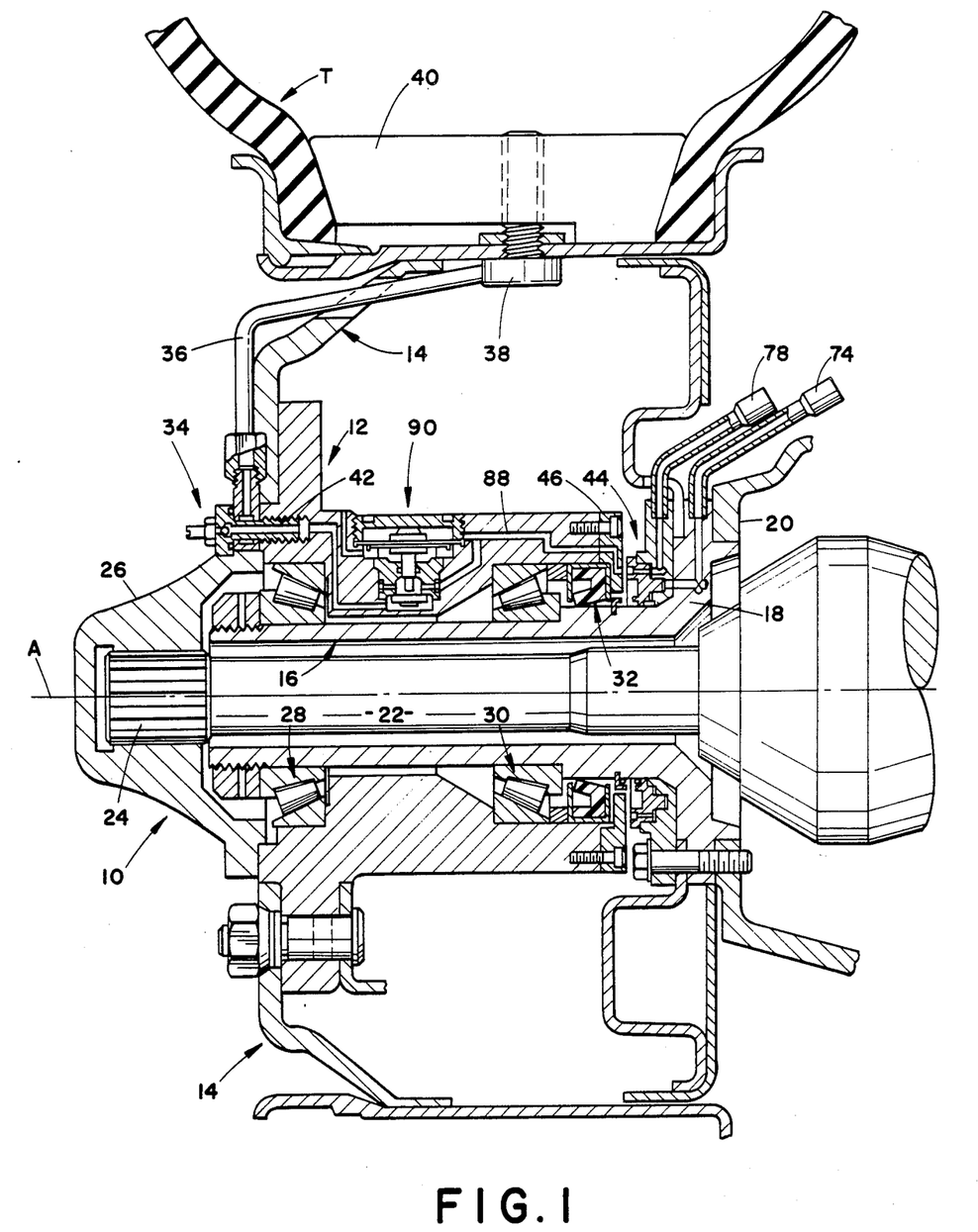
FIG. 1 is a cross-sectional view of a wheel assembly constructed in accordance with the present invention.

With reference now in greater detail to the drawings wherein the showings are for the purpose of illustrating a preferred embodiment of the invention only and not for limiting the invention, FIG. 1 illustrates a wheel assembly 10 comprising a hub component 12 and a rim assembly 14 which carries a pneumatic tire T. The wheel assembly is rotatably mounted on a spindle shaft or axle 16 having a radially extending peripheral flange 18 at its axially inner end which is rigidly secured such as by bolting to the vehicle chassis 20, whereby it will be appreciated that the spindle shaft is a stationary component. A drive shaft 22 extends through spindle shaft 16 and has a splined outer end 24 interengaged with a drive cap component 26. Drive cap 26 is secured to hub component 12 such as by bolts, not shown, whereby rotation of the drive shaft imparts rotation to wheel assembly 10 about axis A. Hub component 12, in a conventional manner, is rotatably supported on spindle shaft 16 by means of roller bearing assemblies 28 and 30 which are protected axially inwardly of the spindle shaft from the ingress of dirt, moisture and the like by a sealing ring component 32. The axially outer end of wheel assembly 10 is provided with an externally accessible manual tire inflating check valve unit 34 which is connected by means of an air line 36 with the interior of pneumatic tire T through a coupling 38 mounted on the tire rim and extending through a tire mounting bead lock 40. Valve unit 34 is mounted in hub 12 and, as will be described in greater detail hereinafter, includes a passageway portion in the hub which permits the flow of air therein to and from tire T in bypassing relationship with respect to the manual fill check valve.

Figure 2:
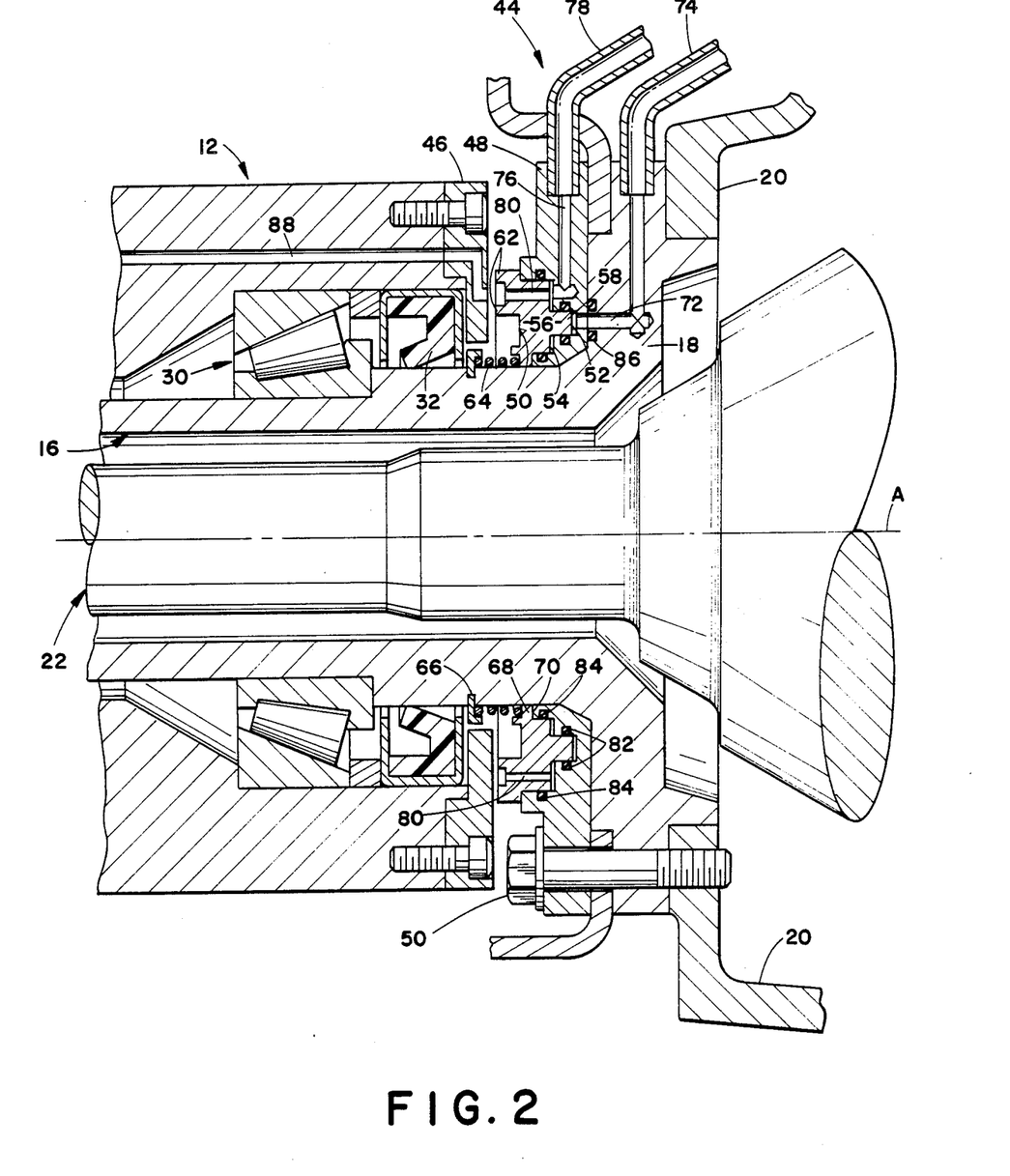
FIG. 2 is an enlarged cross-sectional view of the sealing arrangement between the fixed and rotating parts of the wheel assembly.

As best seen in FIG. 2 of the drawing, wheel assembly 10 and spindle shaft 16 are provided with an air sealing assembly 44 therebetween. Sealing assembly 44 includes a sealing plate 46 mounted on the axially inner end of hub component 12 for rotation therewith and an axially displaceable and non-rotating sealing ring supported on the spindle shaft. More particularly with regard to the latter, an annular mounting plate 48 is received on spindle shaft 16 and is interengaged with inner end 18 thereof against rotation relative thereto such as by means of a plurality of threaded studs 50, only one of which is visible in FIG. 2. The axially outer face of mounting plate 48 is provided with an annular recess extending axially thereinto and circumferentially about the spindle shaft to provide an annular inner air chamber 52 and an annular outer air chamber 54. Chambers 52 and 54 axially slidably support an annular sealing ring member 56 having inner and outer piston-like portions 58 and 60 respectively received in chambers 52 and 54. Sealing ring 56 is transverse to axis A and is provided on its axially outer face with radially spaced apart and circumferentially continuous sealing lips 62 which extend axially toward sealing plate 46 and are normally axially spaced therefrom as shown in FIG. 2. More particularly in this respect, a biasing spring 64 surrounds spindle shaft 16 and is axially engaged between a retaining ring 66 on the spindle shaft and a radially inwardly extending circumferential flange 68 on the sealing ring to bias the latter to the position shown in FIG. 2 in which flange 68 engages an abutment surface 70 on mounting plate 48.

Inner end 18 of spindle shaft 16 is provided with an air passageway 72 having one end communicating with chamber 52 and its opposite end suitably connected to an air line 74 which provides air under pressure to chamber 52 from the air flow control circuitry on the vehicle. Mounting plate 48 is provided with an air passageway 76 having one end communicating with chamber 54 and the other end suitably connected to an air line 78 of the air flow control circuitry, and outer portion 60 of sealing ring 56 is provided with a plurality of axially extending passageways 80 opening at the axially outer ends thereof between sealing lips 62 and at the axially inner ends thereof to chamber 54. Sealing elements 82 prevent the leakage of air between chambers 52 and 54, sealing elements 84 prevent the leakage of air from chamber 54 to the outer face of mounting plate 48, and a sealing element 86 seals against the leakage of air between mounting plate 48 and inner end 18 of spindle shaft 16. As will be explained in greater detail hereinafter, sealing ring 56 is adapted to be displaced to the left in FIG. 2 by air under pressure in chamber 52 for sealing lips 62 to engage sealing plate 46. Such engagement of lips 62 is on radially opposite sides of an air passageway 88 in hub member 12, which passageway is thus placed in flow communication with air passageways 80 in sealing ring 56, chamber 54, air passageway 76, and air line 78.

Figure 3:
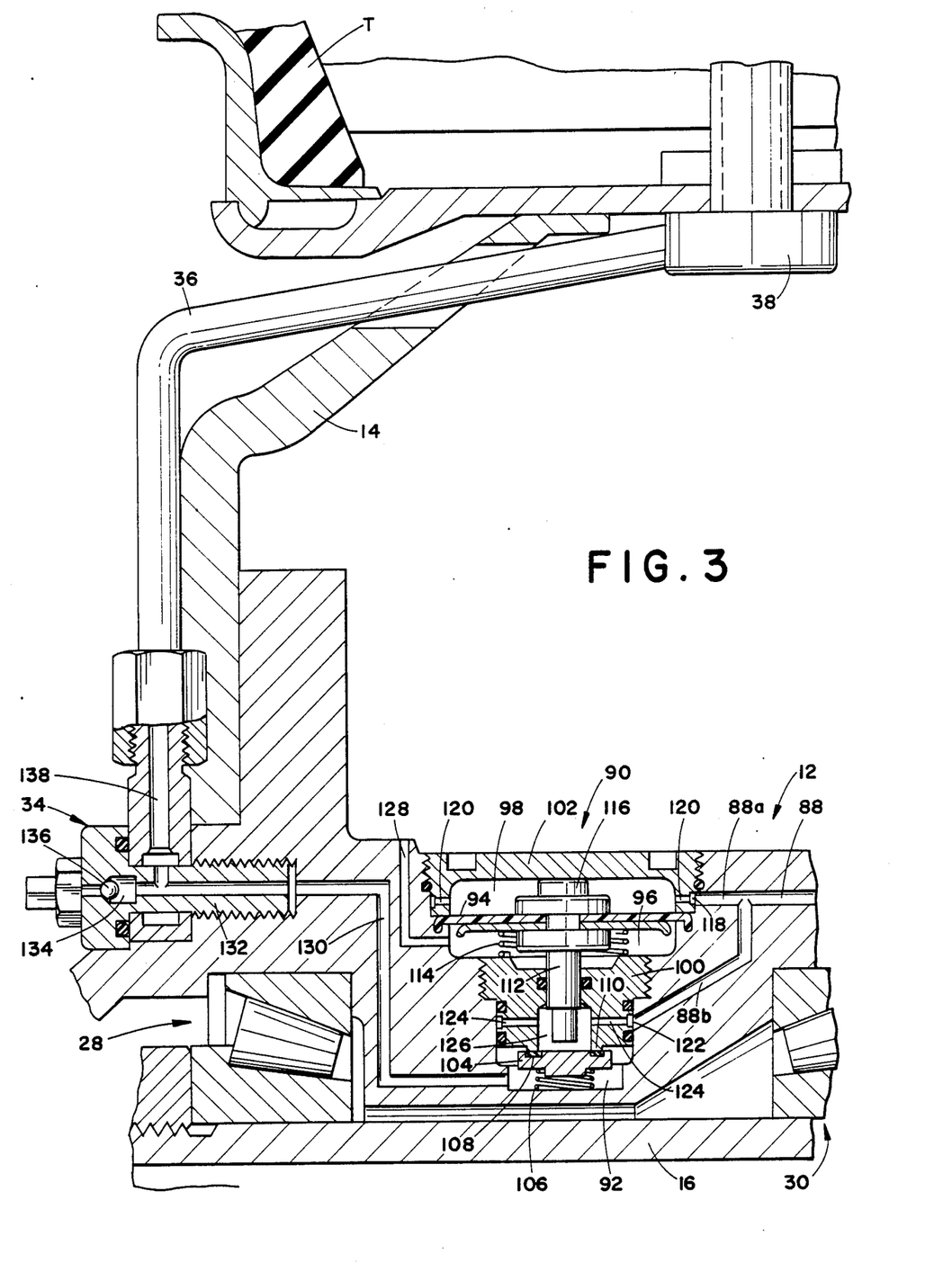
FIG. 3 is an enlarged cross-sectional view of the pilot operated check valve by which the flow of air to and from the vehicle tire is controlled: and, FIG. 4 is a schematic diagram of the air supply and electrical control system by which tire inflating, deflating and pressure checking is achieved.

As best seen in FIG. 3 of the drawing, the tire inflating, deflating and pressure checking apparatus further includes a pneumatically actuated check valve assembly 90 mounted in hub member 12 for controlling the flow of air relative to the corresponding tire T. More particularly, hub component 12 is provided with a radially inwardly extending circular recess which is stepped to provide a check valve chamber 92 and a diaphragm chamber which is divided by a flexible diaphragm 94 to provide a lower diaphragm chamber 96 and an upper diaphragm chamber 98. Chambers 92 and 96 are separated by a partition 100, and upper diaphragm chamber 98 is closed by a cover plate member 102. A check valve element 104 in chamber 92 is biased upwardly by a spring 106 for a sealing ring 108 on the valve element to sealingly engage a circular seating flange 110 on the lower side of partition 100, whereby the check valve is normally closed as shown in FIG. 3. Check valve element 104 is adapted to be opened through the actuation of a diaphragm 94 which carries a stem 112 extending downwardly therefrom through a sealed opening in partition 100 and having a lower end normally slightly spaced above valve element 104 as shown in FIG. 3. Such normal positioning of stem 112 is achieved by means of a diaphragm biasing spring 114 which biases diaphragm 94 upwardly relative to chamber 98 for a bumper 116 on the diaphragm assembly to engage the underside of cover member 102.

Cover member 102 is provided with a circumferentially continuous recess 118 and a plurality of ports 120 opening radially therefrom into upper chamber 98, and air passageway 88 includes a pilot air branch 88a opening into recess 118. Partition member 100 includes a circumferentially continuous recess 122 and a plurality of passageways 124 opening radially therefrom into a chamber 126 above check valve element 104, and air passageway 88 includes a primary air branch 88b opening into recess 122. While not designated numerically, it will be appreciated that appropriate seals are provided between hub component 12 and partition 100, between the hub component and cover member 102 and between diaphragm stem 112 and partition 100. Lower diaphragm chamber 96 is vented to atmosphere by a passageway 128, and an air flow passageway 130 communicates check valve chamber 92 with the vehicle tire through manual fill valve 34 and air line 36. More particularly in this respect, manual fill valve 34 includes a coupling 132 having an air passageway 134 therethrough, one end of which passageway communicates with air flow passageway 130 and the other end of which is provided with a manual fill responsive check valve 136. A branch passageway 138 between check valve 136 and the connection with passageway 130 leads to air line 36 and thus provides for air flow relative to the vehicle tire in bypassing relationship to the manual fill check valve.

In connection with operation of the apparatus described above, the control of which operation will be described in greater detail hereinafter, the component parts are normally in the positions shown in FIGS. 1–3 of the drawing when the system and apparatus are inactive. Thus, it will be appreciated that when the apparatus and system are not being used there is an axial space S between the axially inner end of hub component 12 as defined by sealing plate 46 in the embodiment shown and the axially outer ends of sealing lips 62 of sealing ring 56. It will be further appreciated that space S is open to atmosphere in that the area radially outwardly of the hub assembly defined by the wheel supporting rim assembly 14 is not sealed. When it is desired to inflate, deflate or gauge the pressure of air in tire T, air under pressure is introduced through air line 74 and passageway 72 to chamber 52 behind portion 58 of sealing ring 56, whereby the latter is displaced to the left in FIGS. 1 and 2 against the bias of spring 64 for sealing lips 62 to engage sealing plate 46. Such engagement of lips 62 with sealing plate 46 places air line 78 and passageway 76 in sealed communication with passageway 88 in hub member 12. Such sealed communication continues so long as air under pressure remains in chamber 52, and regardless of whether the vehicle is standing still or is moving in that the recess between sealing lips 62 is radially aligned with passageway 88.

If it is desired to further inflate tire T, air under pressure for the latter purpose is introduced through air line 78 and passageway 76 and across sealing ring 56 through passageways 80 to passageway 88 in hub member 12. As will be appreciated from FIG. 3, a portion of the air under pressure flowing through passageway 88 is diverted by pilot air passageway 88a into upper diaphragm chamber 98 and a portion is diverted by primary air passageway 88b to flow into chamber 126 above check valve element 104. Diaphragm 94 and diaphragm spring 114 are designed for the diaphragm to be displaced downwardly under the lowest pressure which the system is designed to operate under with respect to tire pressure which, in the embodiment disclosed and as will be described hereinafter, is 10 psi. Diaphragm 94 is actuated by the air under pressure in chamber 98 to open check valve 104, whereby air under the desired higher pressure than that in tire T flows from chamber 126 to chamber 92 and thence through passageway 130, the passageways in check valve unit 34 and line 36 to the tire. When the tire pressure reaches the desired level, air flow through lines 74 and 78 is shut-off, whereby spring 64 biases sealing ring 56 to the right in FIG. 2 This vents diaphragm chamber 98 to atmosphere whereby back pressure from tire T through passageway 130 together with biasing spring 106 closes check valve element 104 to seal the tire against deflation. Importantly in connection with termination of such operation of the system, displacement of sealing ring 56 to break the seal between sealing lips 62 and sealing plate 46 results in a sudden release of air under pressure in the system into the open space between the sealing ring and sealing plate 46. This sudden brust of air under pressure advantageously has a self-cleaning effect on the surfaces of the sealing components and a drying effect with respect to any moisture which may accumulate during operation of the system. Moreover, the fact that the space is open to atmosphere advantageously prevents the accumulation of any moisture in the area of the seal during periods of non-use.

If it is desired to deflate tire T as opposed to inflating the tire as in the foregoing example, diaphragm 94 operates to open check valve 104 in the foregoing manner, and air under pressure from tire T flows back through passageway 130 to chamber 126 and passageways 88b and 88 and thence across sealing ring 56 through passageways 80 to passageway 76 and air lines 78 until such time as the pressure is reduced to the desired level. At the latter point, air under pressure in chamber 52 is shut-off, whereby sealing ring 56 is displaced to the right in FIG. 2 as described above. In connection with checking the pressure of the air in tire T, the apparatus is operated in the same manner and the system gauges the pressure without the inflow or outflow of air relative to the tire. All of the above operations will be better understood from the following description of FIG. 4 which schematically illustrates the air flow control system for the apparatus.

Figure 4:
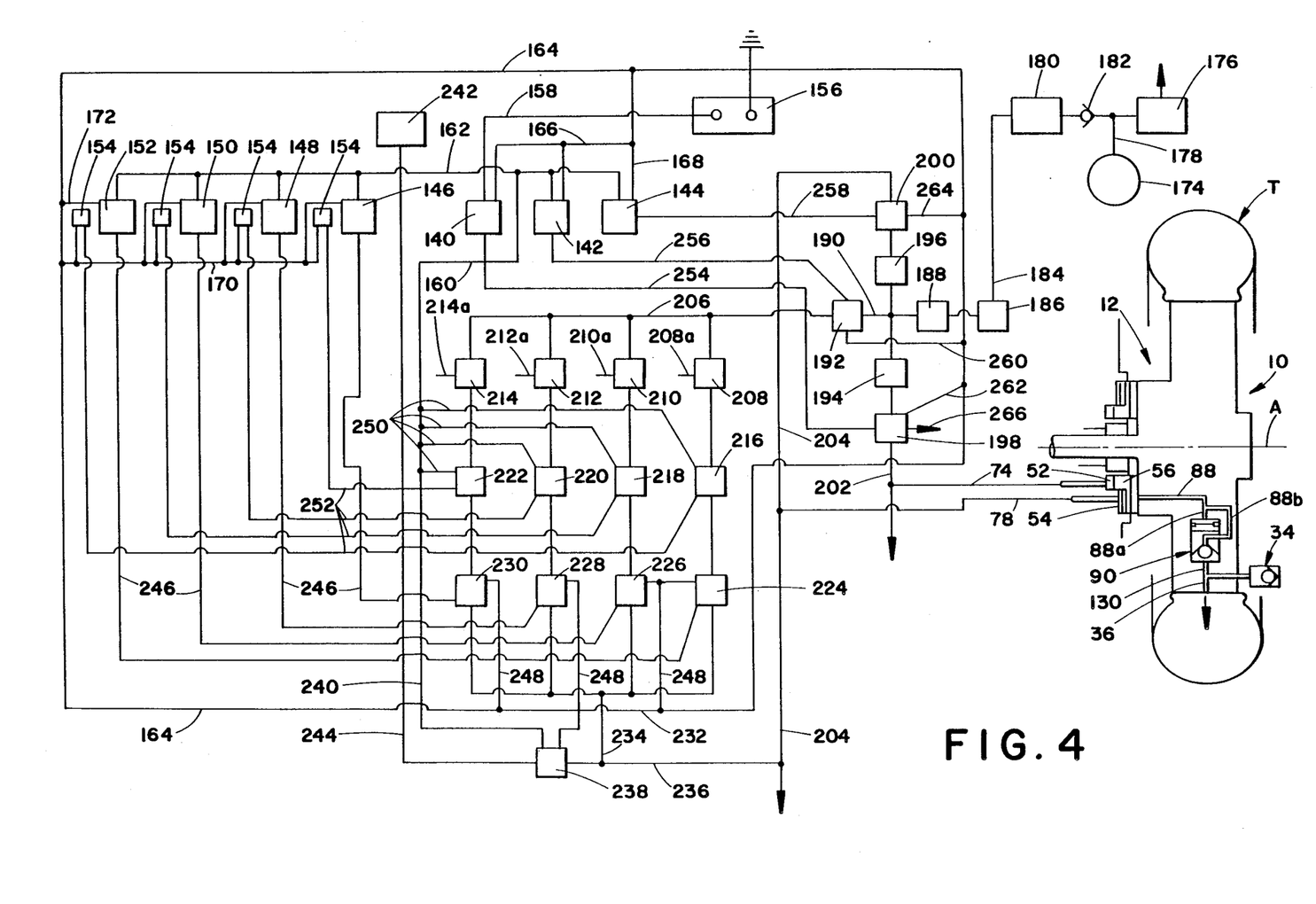

With reference now to FIG. 4, component parts of the wheel assembly described hereinabove in connection with FIGS. 1–3 are identified by like numerals in FIG. 4. The air flow control system is mounted on the vehicle for actuation from a convenient location thereon such as in the vehicle cab and, in the embodiment illustrated, the system is electrically controlled with respect to the tire inflating, deflating and pressure checking functions. Further with regard to the embodiment disclosed, the system provides for the vehicle tires to be selectively inflated or deflated to pressures of 10, 20, 30 and 55 psi. The electrical control circuitry includes an on-off switch 140, and inflate-deflate switch 142 and a pressure check switch 144. With respect to the inflate-deflate functions, the electrical control circuitry further includes normally open pressure selector switches 146, 148, 150 and 152 respectively corresponding to a selected pressure of 10, 20, 30 and 55 psi. Each of the latter four switches has a corresponding pressure indicator light 154 which is energized as described hereinafter to indicate when the vehicle tires are at the selected pressure. The electrical system is energized by the vehicle or a separate battery 156 which is connected to on-off switch 140 by line 158 and is connected through switch 140 to switches 142–152 by a line 160 and a power line 162 common to switches 142–152. Switches 140, 142 and 144 are connected to a ground line 164 by lines 166 and 168. Switches 146, 148 and 150 and pressure indicator lights 154 are connected to ground line 164 by a common line 170 therebetween, and switch 152 is directly connected to ground line 164 by a line 172.

The air supply portion of the system includes a compressor 174 which can be the compressor carried on the vehicle for the vehicle brake system and which, for the latter purpose, supplies air to a brake reservoir 176 by means of a line 178. Line 178 can be conveniently coupled with an air reservoir 180 for the tire air control system through a check valve 182 to prevent back flow toward the compressor and brake air reservoir. Air under pressure from compressor 174 and reservoir 180 flows through a line 184 and a manually operable on-off valve 186 to a pressure reducer 188 to initially reduce the air pressure to a pressure which will enable inflating the vehicle tires to the highest pressure selectable which, in the embodiment disclosed, is 55 psi. Pressure reducer 188 is connected by a line 190 to a normally closed two-way solenoid valve 192 which is operable as described hereinafter to control the flow of air under pressure to and from the vehicle tires in accordance with a selected air pressure for the tires. Pressure reducer 188 is also connected to a second pressure reducer 194 and a third pressure reducer 196 by means of lines communicating therewith and with line 190, and the second and third pressure reducers are respectively in flow communication with a normally closed three-way solenoid valve 198 and a normally closed two-way solenoid valve 200. Solenoid valve 198 is in flow communication with air supply line 74 of wheel assembly 10 by means of a line 202, and the latter line extends beyond its connection with air line 74 for connection with the corresponding air lines of the other wheel assemblies on the vehicle. Two-way solenoid valve 200 is in flow communication with air supply line 78 of wheel assembly 10 through a line 204 which extends beyond its connection with line 78 for connection with the corresponding air supply lines on the other wheel assemblies of the vehicle.

As will be described in detail hereinafter, three-way solenoid valve 198 controls actuation of sealing ring 56 and thus sealing engagement between the supply system and wheel assembly, and solenoid valve 200 functions in connection with gauging the tire pressure. Normally closed solenoid valve 192 is connected by means of a line 206 to supply air under pressure to four vented type pressure regulators 208, 210, 212 and 214 having corresponding vent lines 208a, 210a, 212a and 214a and which regulators, respectively, have fixed settings for the output of air therefrom to have pressures of 55, 30, 20 and 10 psi. The output of pressure regulators 208, 210, 212 and 214 is respectively to normally open pressure responsive switches 216, 218, 220 and 222 and then, respectively, to normally closed two-way solenoid valves 224, 226, 228 and 230. The output side of each of the latter solenoid valves is connected to a common air flow line 232 which is connected to air flow line 204 leading to the wheel assemblies by means of lines 234 and 236. For use in gauging the tire pressure, line 236 is connected to a pressure transducer 238 which is connected to the electrical circuit through switch 140 by means of a line 240 and is connected to a pressure readout gauge 242 by means of an electrical line 244.

With further regard to the electrical circuitry, each of the pressure selector switches 146, 148, 150 and 152 connects power supply line 162 to the corresponding one of the normally closed solenoid valves 224, 226, 228 and 230 by means of lines 246, and each of the solenoid valves is connected to ground line 164 by a line 248. Each of the normally open pressure responsive switches 216, 218, 220 and 222 is connected to power line 162 through switch 140 and line 240 by means of a line 250, and each of the latter pressure responsive switches is connected to the corresponding pressure indicator light 154 by means of a line 252. Completing the electrical circuitry, power line 162 is connected through on-off switch 140 to solenoid valve 198 by line 254, and to solenoid valve 192 through the on-off switch and inflate-deflate switch 142 by line 256. Power line 162 is also connected to solenoid valve 200 through the on-off switch and pressure check switch 144 by line 258, and solenoid valves 192, 198 and 200 are connected to ground line 164 by lines 260, 262 and 264, respectively.

It is believed that the following description of inflating, deflating and pressure checking functions of the apparatus and system will be understood from the foregoing description of FIGS. 1–4. Assuming that the tires T are inflated to a pressure 30 psi and it is desired to inflate the tires to a pressure 55 psi, and presuming that the manual on-off air flow valve 186 is open and the system pressurized, air at system pressure determined by pressure regulator 188 is at normally closed solenoid valve 192 and is at each of the normally closed solenoid valves 198 and 200 at the reduced pressures provided by pressure reducers 194 and 196, respectively. To inflate the tires to 55 psi, the operator first depresses on-off switch 140 which actuates normally closed solenoid valve 198, whereby the latter opens and air at reduced pressure flows through line 202 to line 74 and into chamber 52 to displace sealing ring 56 for sealing lips 62 thereon to engage sealing plate 46. Preferably, on-off switch 140 has a built in indicator light energized to indicate the on condition of the electrical system. The operator then depresses the inflate-deflate switch 142, whereby normally closed solenoid valve 192 is opened and air at system pressure flows through line 206 to each of the pressure reducers 208, 210, 212 and 214 and thence at the reduced pressures provided thereby through the corresponding one of the pressure responsive switches 216, 218, 220 and 222 to the corresponding one of the normally closed solenoid valves 224, 226, 228 and 230 which are closed at this time. Preferably, as with the on-off switch, the inflate-deflate switch has a light which is energized to indicate that the switch is in the inflate-deflate or "on" mode. The operator then pushes the pressure selector switch 152 corresponding to the desired tire pressure of 55 psi. As with switches 140 and 142, the pressure selector switches preferably have lights energized when the corresponding switch is actuated to visually indicate the same. When switch 152 is depressed, power line 162 is connected to solenoid valve 224 to open the latter for air to flow through valve 224 to lines 232 and 234 and thence to line 204 and line 78 opening into chamber 54 behind outer portion 60 of sealing ring 56. Then, as described hereinabove in connection with FIGS. 1–3, the air flows through passageways 80 in sealing ring 56 and through passageway 88 in hub component 12 to actuate diaphragm 94 and open check valve 104 for the air under pressure to flow through branch passageway 88b and thence through the check valve to tire T. When the pressure in tire T and thus in the air lines between the tire and pressure reducer 208 reaches 55 psi further flow is precluded by the pressure reducer, and pressure responsive switch 216 closes to complete a circuit to the indicator light 154 corresponding to pressure selector switch 152, whereby the light is energized to indicate completion of the inflating process. The operator then sequentially depresses selector switch 152, inflate-deflate switch 142 and on-off switch 140. These switch operations respectively de-energize solenoid valves 224, 192 and 198. whereby these valves close and the system is de-energized. During the closing of three-way solenoid valve 198, the air in lines 74 and 202 is vented to atmosphere through a vent line 266, of valve 198, and sealing ring 56 is then biased back to its original position by spring 64. This displacement of sealing ring 56 allows the air under pressure between pilot operated check valve 90 and the sealing ring to escape to atmosphere across the sealed area. When the air under pressure in passageway 88 in hub component 12 is vented to atmosphere in the foregoing manner, it will be appreciated that spring 114 returns diaphragm 94 to its initial position which releases check valve element 104 to return to its original position under the influence of spring 106 and the back pressure of air from tire T. Thus, the check valve element engages seat 110 to seal the tire against deflation.

Presuming that it is desired to deflate the vehicle tires from 55 psi to 20 psi, the operator repeats the sequence of depressing on-off switch 140 and inflate-deflate switch 142 to displace sealing ring 56 to its sealed position, to open pilot operated check valve 90, and to introduce air under pressure into the various parts of the system as described hereinabove in connection with the initial actuations of the on-off and inflate-deflate switches. The operator then depresses pressure selector switch 148 which corresponds to the desired tire pressure of 20 psi, whereby normally closed solenoid valve 228 is connected to power line 162 and opens to place the corresponding pressure reducing valve 212 in communication with the air under pressure in lines 232, 234, 236, 204, 78 and the passageways in the tire assembly leading to the tire. Since the pressure in the latter lines and passageways is at 55 psi, pressure reducing valve 212 operates to vent excess air to atmosphere through the corresponding vent line 212a until the pressure is reduced to 20 psi. At this time the pressure reducer prevents further reduction in the air pressure, and pressure responsive switch 220 is closed to energize the indicator light 154 associated with pressure selector switch 148 to indicate that the deflating operation has been completed. Thereafter, the operator sequentially depresses pressure selector switch 148, inflate-deflate switch 142 and on-off switch 140 as previously described to return the system and the component parts of the apparatus in the wheel assembly to their deactuated positions.

When it is desired to check the pressure in the vehicle tires, the operator first depresses on-off switch 140 to open solenoid valve 198 and actuate sealing ring 56 to its sealing position relative to sealing plate 46 as described hereinabove. The operator then depresses pressure check switch 144 which energizes normally closed solenoid valve 200, whereby the latter opens for air to flow therethrough from line 190 and pressure reducer 196 to line 204 and line 78 and thence through passageway 88 and branch passageway 88a to actuate diaphragm 94 and open check valve element 104. The pressure in tire T is then imposed back through the passageways in the wheel assembly, line 78, line 204 and line 236 to pressure transducer 238. Transducer 238 translates the pressure to an electrical signal which is fed through line 244 to pressure indicator 242 to give a visual readout of the tire pressure. Following such reading, the operator depresses pressure check switch 144 which de-energizes solenoid valve 200 of the latter to close, and then depresses on-off switch 140 to de-energize the electrical system and return the component parts in the wheel assembly to their deactuated positions as described hereinabove.

While considerable emphasis has been placed on a preferred embodiment illustrated and described herein, it will be appreciated that many embodiments of the invention can be made and that many changes can be made in the embodiment disclosed without departing from the principles of the present invention. In particular in this respect, it will be appreciated that other structures and actuating arrangements can be provided for displacing the non-rotating sealing component into and out of engagement with the rotatable component of the wheel assembly, and that different pneumatically actuated check valves and arrangements for controlling the flow of pilot air thereto and the flow of air therethrough to and from the vehicle tire can be devised. As a further example, it is possible to provide a single air line system to the wheel assembly to achieve both actuation of the displaceable seal member and flow of air to the pneumatically actuated check valve and thereacross to and from the vehicle tire, and that appropriate pneumatic and electrical circuitry can be devised for such single line air flow. Still further, while the embodiment disclosed provides for all of the tires of a given vehicle to be simultaneously inflated, deflated or pressure checked, it will be understood that only minor modifications of the control system disclosed would be necessary to provide for the tires to be individually controlled. In this respect, for example, it would be possible to include a solenoid actuated valve controlling flow through lines 74 and 78 leading to each wheel assembly and to provide a corresponding switch in the electrical circuitry by which such solenoid valve would be selectively operable following actuation of the on-off switch to open the valve to a selected one or more of the vehicle tires.

The foregoing modifications, and others, as well as other embodiments of the invention will be obvious to those skilled in the art upon reading the foregoing description of the embodiment disclosed herein. Accordingly, it is to be distinctly understood that the foregoing desciptive matter is to be interpreted merely as illustrate of the present invention and not as a limitation.

Having thus described the invention what is claimed is:

1. Apparatus for controlling the air pressure in a tire on a vehicle having rotatable wheel means carrying said tire and fixed support means rotatably supporting said wheel means comprising, said support means having fixed surface means and said wheel means having rotatable surface means spaced from the opposing said fixed surface means, means providing said wheel means with first air flow passageway means opening through said rotatable surface means into the space between said fixed and rotatable surface means, means providing said support means with second air flow passageway means opening through said fixed surface means into said space, sealing means provided on said fixed support means and displaceable across said space between first and second positions in which said sealing means is respectively spaced from and in engagement with the rotatable surface means of said wheel means, said sealing means in said second position sealingly interengaging said fixed and rotatable surface means and placing said first and second air flow passageway means in sealed flow communication with each other across said space, means to displace said sealing means between said first and second positions, said first passageway means having an end in air flow communication with said tire, and valve means closing said first passageway means to air flow therethrough when said seal means is in said first position.

2. Apparatus according to claim 1, wherein said valve means closing said first passageway means is pneumatically actuatable valve means.

3. Apparatus according to claim 1, wherein said sealing means is pneumatically actuatable from said first to second position thereof.

4. Apparatus according to claim 1, wherein said fixed and rotating surface means of said support means and wheel means are axially opposed with respect to the axis of rotation of said wheel means.

5. Apparatus according to claim 1, wherein said valve means closing said first passageway means is pneumatically actuatable valve means and said sealing means is pneumatically actuatable from said first to said second position thereof.

6. Apparatus according to claim 5, and spring means biasing said sealing means from said second position to said first position.

7. Apparatus according to claim 6, wherein said fixed and rotating surface means of said support means and wheel means are axially opposed with respect to the axis of rotation of said wheel means.

8. Apparatus according to claim 1, wherein said support means includes axle means having an axis, said wheel means includes hub means mounted on said axle means for rotation about said axis and rim means mounted on said hub means for rotation therewith and carrying said tire, said space being between said axle means and hub means, and said displaceable sealing means being mounted on said axle means.

9. Apparatus according to claim 8, wherein said valve means closing said first passageway means is mounted on said hub means.

10. Apparatus according to clam 8, wherein said axle means and hub means have corresponding axially outer and inner ends, said inner ends having axially opposed portions providing said fixed and rotatable surface means, and said space being between said opposed portions.

11. Apparatus according to claim 10, wherein said first passageway means opens axially through said inner end portion of said hub means, and said displaceable sealing means is mounted on said inner end portion of said axle means for axial displacement toward and away from said inner end portion of said hub means.

12. Apparatus according to claim 11, wherein said valve means closing said first passageway means is mounted on said hub means.

13. Apparatus according to claim 11, wherein said second passageway means includes a portion opening axially through said displaceable sealing means.

14. Apparatus according to claim 11, wherein said sealing means includes annular sealing ring means about said axle means and having axially outer and inner ends, means providing annular cylinder means on said axle means axially slidably receiving said sealing ring means, said outer end of said sealing ring means engaging said inner end portion of said hub means in said second position of said sealing means, and said second air passageway means including a portion opening axially through said outer end of said sealing ring means.

15. Apparatus according to claim 14, wherein said means to displace said sealing means between said first and second positions includes third air flow passageway means opening into said cylinder means for air introduced into said chamber means to displace said sealing ring means axially outwardly relative thereto from said first to said second position.

16. Apparatus according to claim 15, and spring means biasing said sealing ring means inwardly of said cylinder means to said first position.

17. Apparatus according to claim 16, wherein said valve means closing said first passageway means is mounted on said hub means.

18. Apparatus according to claim 17, wherein said valve means is pneumatically actuatable to open said first passageway means, and said first passageway means includes a control air flow passageway for air to actuate said valve means.

19. Apparatus according to claim 18, wherein a portion of said first air flow passageway means including said control passageway is in said hub means between said inner and outer ends thereof, and said valve means is in said hub means and includes a valve element displaceable between first and second positions respectively closing and opening said portion of said first passageway means for flow therethrough, and diaphragm means for displacing said valve element from said first to said second position thereof, said diaphragm being actuated by air flow through said control air passageway.

20. A system for controlling the air pressure in a tire on a vehicle having rotatable wheel means carrying said tire and fixed support means rotatably supporting said wheel means, comprising said wheel means having rotatable surface means, said support means having fixed surface means opposed to and spaced from said rotatable surface means to provide a space therebetween normally open to atmosphere, a source of air under pressure on said vehicle, air flow passageway means between said source and said tire and including a first portion in said wheel means opening through said rotatable surface means to said space and a second portion in said support means opening through said fixed surface means to said space, displaceable sealing means provided on said fixed support means and having a first position in which said sealing means is spaced from said rotating surface means and a second position in which said sealing means sealingly interengages said rotatable surface means and places said passageway portions in sealed flow communication with each other across said space, valve means closing said first passageway portion when said sealing means is in said first position, and control means on said vehicle for displacing said sealing means from said first position to said second position, opening said valve means and selectively increasing, decreasing or gauging the pressure of air in said tire.

21. The system according to claim 20, wherein said valve means closing said first passageway portion is pneumatically actuated to open, and said control means includes means controlling the flow of air under pressure from said source to said valve means.

22. The system according to claim 21, wherein said means controlling the flow of air from said source to said valve means includes means selectively operable to increase, decrease or gauge the pressure of air in said tire.

23. The system according to claim 22, wherein said selectively operable means includes a plurality of different air pressure regulating means between said source and said second passageway portion and means to selectively connect each said regulating means in flow communication with said second passageway portion.

24. The system according to claim 23, wherein said selectively operable means further includes pressure indicator means and pressure gauging valve means between said source and said second passageway portion, and means to actuate said pressure gauging valve means for air to flow under pressure from said source to said valve means closing said first passageway portion.

25. The system according to claim 20, wherein said sealing means is pneumatically actuated from said first to said second position thereof and said control means includes means controlling the flow of air under pressure from said source to said sealing means.

26. The system according to claim 25, wherein said valve means closing said first passageway portion is pneumatically actuated to open and said control means includes means controlling the flow of air under pressure, from said source to said valve means.

27. The system according to claim 26, wherein said means controlling the flow of air from said source to said valve means includes means selectively operable to increase, decrease or gauge the pressure of air in said tire.

28. The system according to claim 27, wherein said selectively operable means includes a plurality of different air pressure regulating means between said source and said second passageway portion and means to selectively connect each said regulating means in flow communication with said second passageway portion.

29. The system according to claim 28, wherein said selectively operable means further includes pressure indicator means and pressure gauging valve means between said source and said second passageway portion, and means to actuate said pressure gauging valve means for air to flow under pressure from said source to said valve means closing said first passageway portion.

* * * * *